United States Patent
Saito et al.

(10) Patent No.: US 9,807,090 B2
(45) Date of Patent: Oct. 31, 2017

(54) PERSON AUTHENTICATION METHOD

(71) Applicant: Kabushiki Kaisha Toshiba, Minato-ku (JP)

(72) Inventors: Hiroo Saito, Tachikawa (JP); Hiroshi Sukegawa, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/066,855

(22) Filed: Mar. 10, 2016

(65) Prior Publication Data
US 2016/0269401 A1 Sep. 15, 2016

(30) Foreign Application Priority Data
Mar. 13, 2015 (JP) ................. 2015-050934

(51) Int. Cl.
*G06K 9/00* (2006.01)
*H04L 29/06* (2006.01)
(Continued)

(52) U.S. Cl.
CPC .......... *H04L 63/0861* (2013.01); *G06F 21/30* (2013.01); *G06F 21/32* (2013.01); *G06K 9/00275* (2013.01); *G06K 9/00281* (2013.01); *G06K 9/00288* (2013.01); *G06K 9/00926* (2013.01); *G07C 9/00007* (2013.01); *G06K 2009/00322* (2013.01)

(58) Field of Classification Search
CPC .................... G06F 21/30; G06F 21/32; G06K 2009/00322; G06K 9/00275; G06K 9/00281; G06K 9/00288; G06K 9/00926; H04L 63/0861; G07C 9/00007
USPC .......................................... 382/118
See application file for complete search history.

(56) References Cited

U.S. PATENT DOCUMENTS

| | | | |
|---|---|---|---|
| 8,407,767 B2* | 3/2013 | Gajjala | G06F 21/33 726/18 |
| 9,213,811 B2* | 12/2015 | White | G06F 21/31 |

(Continued)

FOREIGN PATENT DOCUMENTS

| | | |
|---|---|---|
| CN | 103886284 A | 6/2014 |
| JP | 2003-281546 | 10/2003 |

(Continued)

OTHER PUBLICATIONS

Extended European Search Report dated Jun. 28, 2016 in Patent Application No. 16159634.1.

(Continued)

*Primary Examiner* — Kanjibhai Patel
(74) *Attorney, Agent, or Firm* — Oblon, McClelland, Maier & Neustadt, L.L.P.

(57) ABSTRACT

According to one embodiment, a person authentication method includes obtaining, from a medium carried by a person who passes through a first position, first information indicating the gender and the age of the person; performing a first authentication operation with respect to a person whose face image is included in a first image obtained by capturing a person passing through the first position; and setting, as the first authentication operation, an authentication operation to be performed using the face image of a person having the gender and the age specified in the first information.

4 Claims, 5 Drawing Sheets

(51) Int. Cl.
G06F 21/30 (2013.01)
G07C 9/00 (2006.01)
G06F 21/32 (2013.01)

(56) References Cited

U.S. PATENT DOCUMENTS

| | | | |
|---|---|---|---|
| 9,483,629 B2* | 11/2016 | Krawczyk | G06F 21/31 |
| 2008/0080748 A1 | 4/2008 | Sukegawa et al. | |
| 2009/0080715 A1* | 3/2009 | van Beek | A61B 5/0059 |
| | | | 382/118 |
| 2009/0322866 A1* | 12/2009 | Stotz | G07C 9/00087 |
| | | | 348/77 |
| 2011/0135168 A1 | 6/2011 | Hosoi | |
| 2015/0047000 A1* | 2/2015 | Spencer, III | H04L 63/0876 |
| | | | 726/7 |

FOREIGN PATENT DOCUMENTS

| | | |
|---|---|---|
| JP | 2009-31991 | 2/2009 |
| JP | 2011-39959 | 2/2011 |
| JP | 5109564 | 12/2012 |

OTHER PUBLICATIONS

Konstantinos Veropoulos, et al., "Investigating the Impact of Face Categorization on Recognition Performance" Lecture Notes in Computer Science, XP019025295, 2005, pp. 207-218.

Tsz-Ho Yu, et al., "Unsupervised Real-Time Unusual Behavior Detection for Biometric-Assisted Visual Surveillance" Lecture Notes in Computer Science, XP019117890, 2009, pp. 1019-1029.

* cited by examiner

PERSON AUTHENTICATION METHOD

CROSS-REFERENCE TO RELATED APPLICATIONS

This application is based upon and claims the benefit of priority from Japanese Patent Application No. 2015-050934, filed Mar. 13, 2015, the entire contents of which are incorporated herein by reference.

FIELD

Embodiments described herein relate generally to a person authentication method.

BACKGROUND

A technology is known in which, with respect to a large number of passersby in key facilities or common facilities, biological information such as the face images in the passports are used to perform authentication of the persons.

The authentication of a person using biological information is performed by matching biological information such as the face image obtained from a passport with biological information such as the face image included in an image taken while the person passes through. However, since the authentication is performed without taking into account aging or the gender of the person, sometimes there is a decline in the authentication accuracy due to a factor such as aging or the gender of the person.

DETAILED DESCRIPTION

In general, according to one embodiment, a person authentication method comprised obtaining, from a medium carried by a person who passes through a first position, first information indicating the gender and the age of the person; performing a first authentication operation with respect to a person whose face image is included in a first image obtained by capturing a person passing through the first position; and setting, as the first authentication operation, an authentication operation to be performed using the face image of a person having the gender and the age specified in the first information.

Exemplary embodiments of a person authentication system, in which a person authentication method is implemented, are described below with reference to the accompanying drawings.

Figure 1:
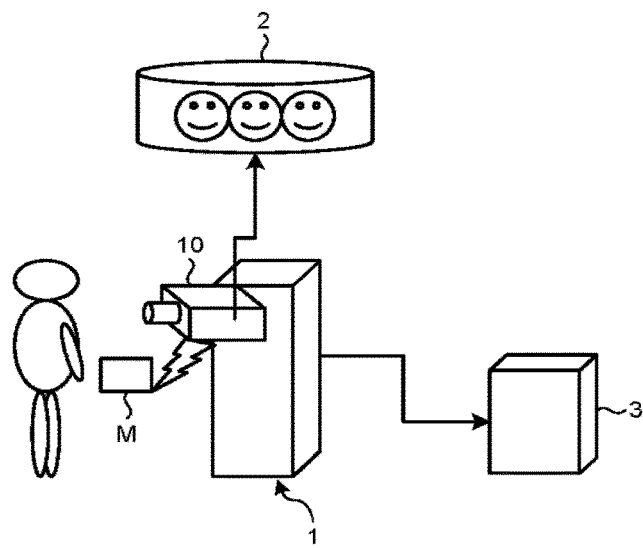
FIG. 1 is a diagram illustrating an exemplary configuration of a person authentication system according to a first embodiment.

FIG. 1 is a diagram illustrating an exemplary configuration of a person authentication system according to a first embodiment. In the person authentication system according to the first embodiment, based on the age, the gender, the name, and the face image specified in the passport (an example of a medium) carried by each person who passes through an immigration gate (an example of a first position), the operation of authenticating the person passing through the immigration gate is adjusted so as to enhance the authentication accuracy with respect to that person.

In the first embodiment, the explanation is given for an example in which the person authentication system is implemented at an immigration gate. However, that is not the only possible case. As long as the person authentication system is implemented in a system that performs authentication of persons at a position through which a large number of persons pass, it serves the purpose. For example, the person authentication system can be implemented in an access management system or a visual surveillance system at public facilities, key facilities, office buildings, and commercial facilities where a number of persons pass through.

As illustrated in FIG. 1, the person authentication system according to the first embodiment includes a first immigration authentication device 1 that performs authentication of each person leaving the country; a biological information management device 2 (an example of a server) that has a memory for storing a variety of information such as history information regarding the authentication of each person leaving the country; and a first departure gate 3 for restricting the departure of the persons who are not successfully authenticated by the first immigration authentication device 1.

The first immigration authentication device 1 includes an image obtaining unit 10 that is capable of taking images of the persons passing through the first departure gate 3. The first immigration authentication device 1 reads (obtains) the face image from a passport M carried by a person passing through the first departure gate 3, and performs an authentication operation for determining whether or not the person whose face image is included in the image taken by the image obtaining unit 10 is the same person whose face image is read from the passport M.

Figure 2:
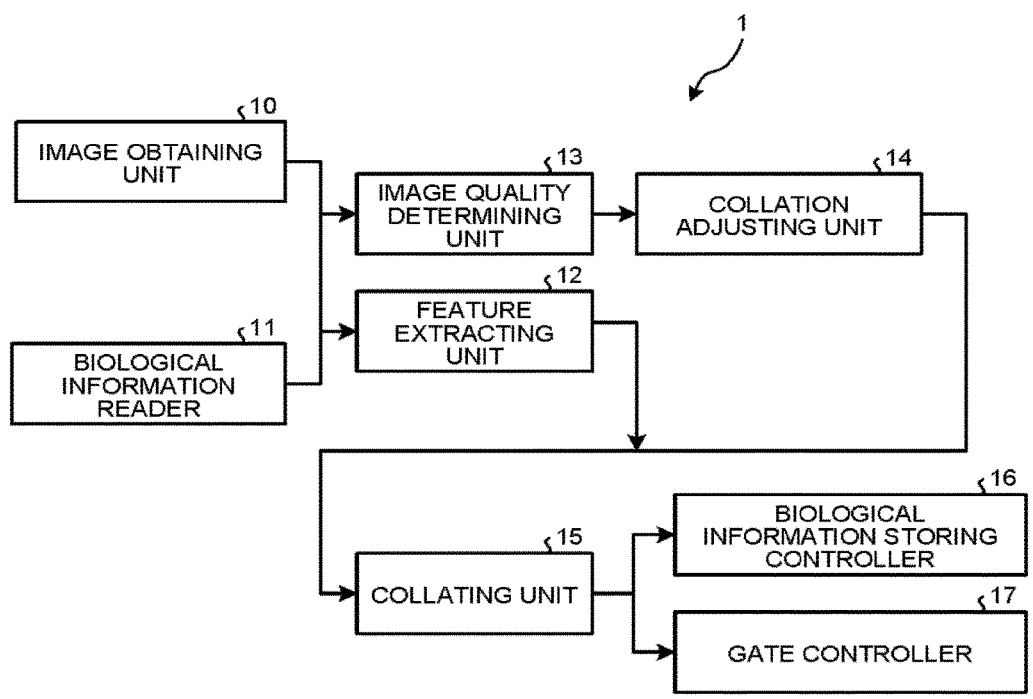
FIG. 2 is a block diagram illustrating an exemplary functional configuration of a first immigration authentication device included in the person authentication system according to the first embodiment.

FIG. 2 is a block diagram illustrating an exemplary functional configuration of the first immigration authentication device included in the person authentication system according to the first embodiment. As illustrated in FIG. 2, in the first embodiment, the first immigration authentication device 1 includes the image obtaining unit 10, a biological information reader 11, a feature extracting unit 12, an image quality determining unit 13, a collation adjusting unit 14, a collating unit 15, a biological information storing controller 16, and a gate controller 17.

The image obtaining unit 10 represents an imaging unit capable of taking images of the persons passing through the first departure gate 3. In the first embodiment, the image obtaining unit 10 is configured with a video camera that converts a captured image (an example of a first-type image), which are obtained by performing imaging of the persons passing through the first departure gate 3, into digital image data, and outputs the image data.

The biological information reader 11 reads, from the passport M carried by each person passing through the first departure gate 3, identification information (an example of first information) indicating at least the age and the gender of the concerned person. In the first embodiment, the biological information reader 11 reads, from the items written in each passport M, passport information such as the passport number that enables identification of the concerned passport M. Moreover, the biological information reader 11 reads, from an IC chip installed in each passport M, the biological information (the face image, fingerprint information, and the iris) of the owner of the passport M. Furthermore, the biological information reader 11 reads, from the items specified in the passport M, identification information (such as the name, the birthdate, the gender, the age, the affiliation, and the personal history) that enables identification of the owner of the passport M.

In the first embodiment, the biological information reader 11 reads the passport information, the biological information, and the identification information from the passport M. However, that is not the only possible case. Alternatively, as long as the passport information, the biological information, and the identification information can be obtained from a medium carried by the person, it serves the purpose. For example, the biological information reader 11 can make use of a card reader, a numeric keypad, a touch-sensitive panel, or a camera; and obtain the passport information, the biological information, and the person information that is input.

The feature extracting unit 12 extracts a face image from an image based on the image data output from the image obtaining unit 10 (i.e., from a captured image that is taken by the image obtaining unit 10 by means of imaging). In the first embodiment, the feature extracting unit 12 moves a predetermined template, which is used for extracting the face image, within the captured image and obtains a correlation value. The feature extracting unit 12 then extracts, as the face image, the position in the captured image having the highest correlation value with the predetermined template. Thus, in the first embodiment, the feature extracting unit 12 extracts the face image from a captured image using a predetermined template. However, that is not the only possible case. Alternatively, for example, the face image can be extracted from a captured image according to the eigenspace method or the subspace method.

Meanwhile, the feature extracting unit 12 detects, from the extracted face image, position information about the features such as the eyes and the nose. If the captured image obtained by the image obtaining unit 10 is a moving image, then the feature extracting unit 12 extracts the face image from each frame constituting the moving image (i.e., tracks the face images captured in the moving image) and, from among the face images extracted from the frames, selects the face image satisfying a predetermined image condition for authentication. Herein, the image condition for authentication represents a suitable condition for authenticating the face image. Examples of the image condition for authentication include a face image obtained by capturing the face of a person from the front side. Then, from the selected face image, the feature extracting unit 12 detects position information about the features such as the eyes and the nose in the face image.

Subsequently, the feature extracting unit 12 outputs the extracted feature information of the concerned face image to the collating unit 15. More particularly, based on the position information about the extracted features in the face image; the feature extracting unit 12 clips the face area of a predetermined size from the extracted face image. Then, the feature extracting unit 12 sets grayscale information of the clipped face area as the feature information of the selected face image. For example, the feature extracting unit 12 sets the grayscale information of the clipped face area as a feature vector having n×m dimensions.

The image quality determining unit 13 detects the factors causing abnormality in a captured image. In the first embodiment, the image quality determining unit 13 detects, as a factor causing abnormality, the image quality such as the image contrast or the noise attributed to encoding. For example, the image quality determining unit 13 obtains a factor causing abnormality, such as the image contrast or the noise attributed to encoding, from the distribution of luminance values of the captured image. Moreover, in the first embodiment, as a factor causing abnormality, the image quality determining unit 13 detects expression (smiley face or closed eyes), sunglasses, mask, hiding of the face by hair, or beard in the face image.

Furthermore, in the first embodiment, based on the distribution of luminance in the captured image (for example, regarding each area obtained by dividing the captured image vertically or horizontally, based on the difference between the average value and the maximum value or the minimum value of the luminance), the image quality determining unit 13 detects an insufficient lighting condition or an excessive lighting condition during imaging as a factor causing abnormality. Alternatively, the image quality determining unit 13 can refer to control information (such as the shutter speed and the gain) of the image obtaining unit 10 (a camera) and can detect an insufficient lighting condition or an excessive lighting condition during imaging as a factor causing abnormality.

The collation adjusting unit 14 sets, as a first authentication operation representing the authentication operation to be performed by the collating unit 15 (described later), the authentication operation including the use of the face image of the person whose age and gender is specified in the identification information read by the biological information reader 11. As a result, the authentication operation is performed using a face image that does not have much difference with the face image to be authenticated. That enables achieving stability in the authentication accuracy with respect to aging or the difference in the gender.

In the first embodiment, the collation adjusting unit 14 obtains, from a memory (not illustrated), the face image corresponding to the age specified in the identification information that is read by the biological information reader 11. Then, the collation adjusting unit 14 obtains feature vectors (feature information) of the obtained face image using the constrained mutual subspace method, and obtains a subspace including the set of feature vectors of the obtained face image. Alternatively, the collation adjusting unit 14 obtains, from the memory (not illustrated), the face image corresponding to the gender specified in the identification information that is read by the biological information reader 11. Then, the collation adjusting unit 14 obtains feature vectors (feature information) of the obtained face image using the constrained mutual subspace method, and obtains a subspace including the set of feature vectors of the obtained face image. Subsequently, the collation adjusting unit 14 sets, as the first authentication operation, the operation of authenticating the person with the concerned face image using the obtained subspace.

Alternatively, as the first authentication operation, the collation adjusting unit 14 can set the authentication operation performed using the face image having the same factor causing abnormality as the factor causing abnormality detected by the image quality determining unit 13. As a result, when the face image to be authenticated includes a factor causing abnormality, the authentication operation is performed using a face image that does not have much difference with the face image including the factor causing abnormality. That enables achieving stability in the authentication accuracy with respect to the factor causing abnormality.

The collating unit 15 implements the first authentication operation as set by the collation adjusting unit 14, and authenticates the person whose face image is included in the captured image. In the first embodiment, the collating unit 15 obtains the degree of similarity between the subspace obtained by the collation adjusting unit 14 and the subspace in the feature information extracted by the feature extracting unit 12. If the degree of similarity exceeds a predetermined threshold value, then the collating unit 15 determines that the person whose face image is included in the captured image is the same person who is identified by the identification information read from the passport M by the biological information reader 11. In the first embodiment, the collating unit 15 implements the subspace method or the multiple similarity method, and calculates the angle formed by two subspaces as the degree of similarity between those two subspaces. Meanwhile, as the similarity measure other the degree of similarity, it is possible to use the distance such as the Euclidean distance or the Mahalanobis' generalized distance in the feature space. In the case of using distance as the similarity measure, greater the numerical value, lower becomes the similarity.

When the person whose face image is included in a captured image is determined to be the same person who is identified by the identification information read from the passport M by the biological information reader 11 (i.e., when the first authentication operation performed by the collating unit 15 is successful); the biological information storing controller 16 stores, in a memory of the biological information management device 2 (an example of a first memory), identification information of the person who was successfully authenticated in the first authentication operation by the collating unit 15 and history information of the first authentication operation (hereinafter, called authentication history information) in a corresponding manner. In the first embodiment, the authentication history information contains the face image used in the first authentication operation that was successful (or contains the feature information of the face image, or contains the subspace specified in the feature information of the face image, or contains the correlation matrix of the face image), or contains the biological information read by the biological information reader 11.

In the first embodiment, when the first authentication operation performed by the collating unit 15 is successful; the biological information storing controller 16 stores, in the biological information management device 2, the identification information of the person who was successfully authenticated in the first authentication operation by the collating unit 15 and the authentication history information of the successful first authentication operation in a corresponding manner. However, that is not the only possible case. For example, the biological information storing controller 16 can store the identification information of the person who was successfully authenticated in the first authentication operation by the collating unit 15 and the authentication history information of the successful first authentication operation in a corresponding manner in a memory medium (an example of a first memory), such as an IC chip installed in the passport M.

The gate controller 17 controls the opening and closing of the first departure gate 3 based on the result of the first authentication operation performed by the collating unit 15. More particularly, when the person whose face image is included in a captured image is determined to be the same person who is identified by the identification information read from the passport M, the gate controller 17 opens the first departure gate 3 and allows that person to pass through the first departure gate 3. However, if the person whose face image is included in a captured image is determined not to be the same person who is identified by the identification information read from the passport M, the gate controller 17 keeps the first departure gate 3 closed and prohibits that person from passing through the first departure gate 3.

Meanwhile, in case the first departure gate 3 or a door for restricting the passage of persons is not installed at the departure counter, only if the authentication of a person is successful and that person passes through, the first immigration authentication device 1 can store the face image included in the captured image or the biological information read by the biological information reader 11 and the identification information read by the biological information reader 11 in a corresponding manner in the biological information management device 2. With that, by checking the biological information stored in the biological information management device 2, it becomes possible to identify the persons who have passed through the departure counter. On the other hand, if the first authentication operation ends in failure, the first immigration authentication device 1 can issue a warning using a sound; notify other terminals about the failure in the first authentication operation; and store the face image of the person who was not successfully authenticated in the first authentication operation.

Figure 3:
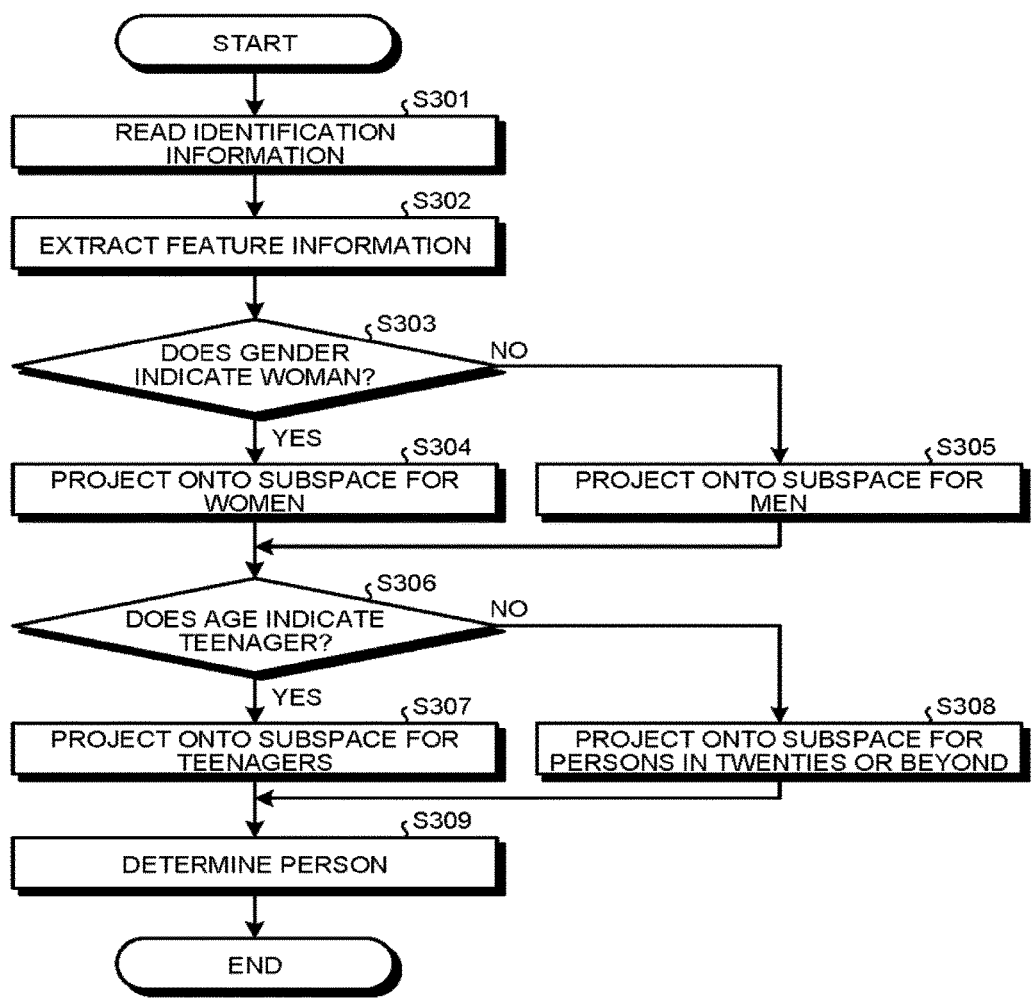
FIG. 3 is a flowchart for explaining a flow of operations during an authentication operation performed in the person authentication system according to the first embodiment.

Explained below with reference to FIG. 3 is a flow of operations during an authentication operation performed in the person authentication system according to the first embodiment. FIG. 3 is a flowchart for explaining a flow of operations during an authentication operation performed in the person authentication system according to the first embodiment.

The biological information reader 11 reads identification information from the passport M carried by a person who approaches the first departure gate 3 (Step S301). Moreover, the feature extracting unit 12 extracts feature information from the face image included in the captured image, which is obtained by the image obtaining unit 10 by performing imaging of the person approaching the first departure gate 3 (Step S302).

Then, based on the identification information read by the biological information reader 11, the collation adjusting unit 14 determines whether or not the person passing through the first departure gate 3 is a woman (Step S303). If the person passing through the first departure gate 3 is determined to be a woman (Yes at Step S303), then the collation adjusting unit 14 obtains face images of women from a memory (not illustrated). Then, the collation adjusting unit 14 obtains the feature vectors of the obtained face images and obtains a subspace (a subspace for women) including the set of feature vectors of the obtained face images. Subsequently, the collation adjusting unit 14 sets, as the first authentication operation, the operation of authenticating the person with the concerned face image by using the subspace for women. Moreover, the collating unit 15 projects the feature information, which is extracted by the feature extracting unit 12, on the subspace for women (Step S304) and obtains the degree of similarity between the subspace for women and the subspace specified in the feature information extracted by the feature extracting unit 12.

Meanwhile, if the person passing through the first departure gate 3 is determined to be a man (No at Step S303), then the collation adjusting unit 14 obtains face images of men from a memory (not illustrated). Then, the collation adjusting unit 14 obtains the feature vectors of the obtained face images and obtains a subspace (a subspace for men) including the set of feature vectors of the obtained face images. Subsequently, the collation adjusting unit 14 sets, as the first authentication operation, the operation of authenticating the person with the concerned face image by using the subspace for men. Moreover, the collating unit 15 projects the feature information, which is extracted by the feature extracting unit 12, on the subspace for men (Step S305) and obtains the degree of similarity between the subspace of men and the subspace specified in the feature information extracted by the feature extracting unit 12.

Moreover, based on the identification information read by the biological information reader 11, the collation adjusting unit 14 determines whether or not the person passing through the first departure gate 3 is a teenager (Step S306). If the person passing through the first departure gate 3 is determined to be a teenager (Yes at Step S306), then the collation adjusting unit 14 obtains face images of teenagers from a memory (not illustrated). Then, the collation adjusting unit 14 obtains the feature vectors of the obtained face images and obtains a subspace (a subspace for teenagers) including the set of feature vectors of the obtained face images. Subsequently, the collation adjusting unit 14 sets, as the first authentication operation, the operation of authenticating the person of the concerned face image by using the subspace for teenagers. Moreover, the collating unit 15 projects the feature information, which is extracted by the feature extracting unit 12, on the subspace for teenagers (Step S307) and obtains the degree of similarity between the subspace for teenagers and the subspace specified in the feature information extracted by the feature extracting unit 12.

Meanwhile, if the person passing through the first departure gate 3 is determined to be in twenties or beyond (No at Step S306), then the collation adjusting unit 14 obtains face images of persons in twenties or beyond from a memory (not illustrated). Then, the collation adjusting unit 14 obtains the feature vectors of the obtained face images and obtains a subspace (a subspace for persons in twenties or beyond) including the set of feature vectors of the obtained face images. Subsequently, the collation adjusting unit 14 sets, as the first authentication operation, the operation of authenticating the person with the concerned face image by using the subspace for persons in twenties or beyond. Moreover, the collating unit 15 projects the feature information, which is extracted by the feature extracting unit 12, on the subspace for persons in twenties or beyond (Step S308) and obtains the degree of similarity between the subspace for persons in twenties or beyond and the subspace specified in the feature information extracted by the feature extracting unit 12.

If the degree of similarity between the subspace for women (or the subspace for men) and the subspace specified in the feature information of the concerned face image as well as the degree of similarity between the subspace for teenagers (or the subspace for persons in twenties or beyond) and the subspace specified in the feature information of the concerned face image is exceeding the first threshold value, then the collating unit 15 determines that the person whose face image is included in the captured image is the same person who is identified by the identification information read from the passport M (Step S309). That is, the collating unit 15 determines that the person whose face image is included in the captured image is successfully authenticated in the first authentication operation.

On the other hand, if at least either the degree of similarity between the subspace for women (or the subspace for men) and the subspace specified in the feature information of the concerned face image or the degree of similarity between the subspace for teenagers (or the subspace for persons in twenties or beyond) and the subspace specified in the feature information of the concerned face image is not exceeding the first threshold value, then the collating unit 15 determines that the person whose face image is included in the captured image is different than the person identified by the identification information read from the passport M (Step S309). That is, the collating unit 15 determines that the person whose face image is included in the captured image is not successfully authenticated in the first authentication operation.

In this way, in the person authentication system according to the first embodiment, the authentication operation is performed using a face image that does not have much difference with the face image to be authenticated. That enables achieving stability in the authentication accuracy with respect to aging or the difference in the gender.

In a second embodiment, the explanation is given for an example in which a second immigration authentication device is installed that performs re-authentication of each person passing through a second departure gate which is positioned at the downstream side of the first departure gate in the direction of traffic of the persons. In the following explanation, the details identical to the first embodiment are not repeatedly explained.

Figure 4:
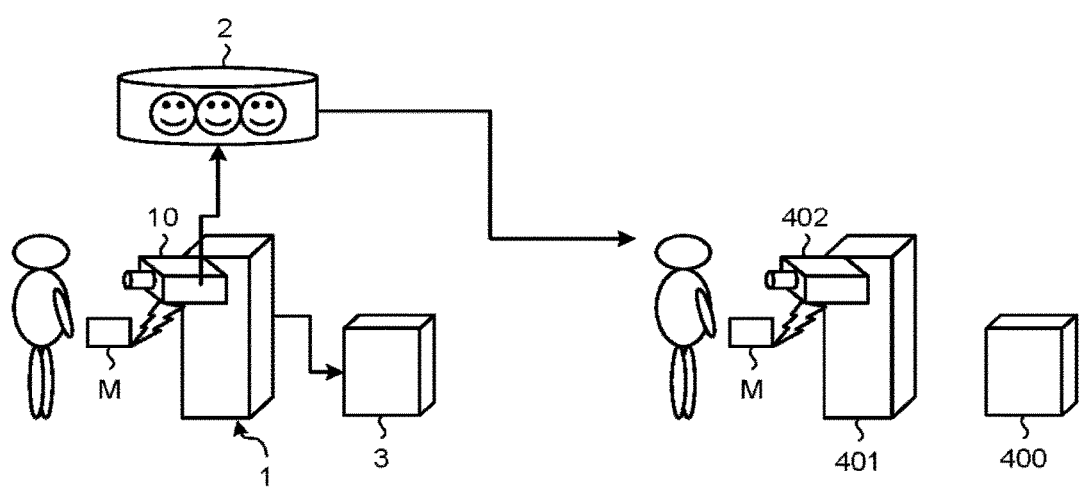
FIG. 4 is a diagram illustrating an exemplary configuration of a person authentication system according to a second embodiment.

FIG. 4 is a diagram illustrating an exemplary configuration of a person authentication system according to the second embodiment. In the second embodiment, the person authentication system includes a second immigration authentication device 401 at a second departure gate 400 (an example of a second position) that is positioned at the downstream side of the first departure gate 3 in the direction of traffic of the persons passing through the immigration gate.

Regarding a person passing through the second departure gate 400, in case the authentication result obtained by the first immigration authentication device 1 has low reliability, the second immigration authentication device 401 performs a re-authentication operation with respect to that person. More particularly, in an identical manner to the first immigration authentication device 1, the second immigration authentication device 401 includes an image obtaining unit 402 that is capable of taking images of the persons passing through the second departure gate 400. The second immigration authentication device 401 reads (obtains) the face image from the passport M carried by a person passing through the second departure gate 400, and performs an authentication operation for determining whether or not the person whose face image is included in the captured image (an example of a second image) obtained by the image obtaining unit 402 is the same person whose face image is read from the passport M.

Figure 5:
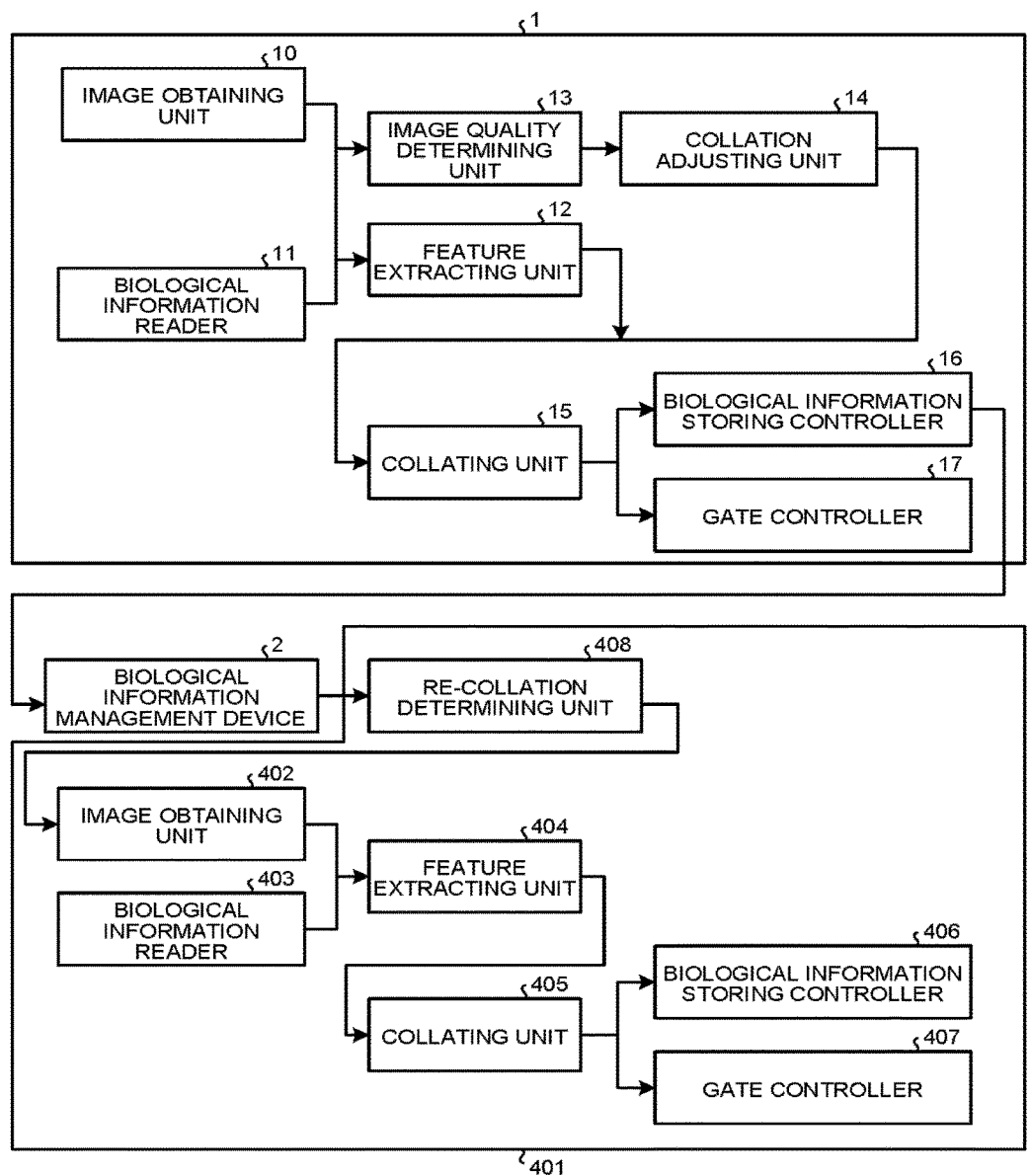
FIG. 5 is a block diagram illustrating an exemplary functional configuration of the first immigration authentication device and a second immigration authentication device included in the person authentication system according to the second embodiment.

FIG. 5 is a block diagram illustrating an exemplary functional configuration of the first immigration authentication device and the second immigration authentication device included in the person authentication system according to the second embodiment. As illustrated in FIG. 5, in the second embodiment, the second immigration authentication device 401 includes the image obtaining unit 402, a biological information reader 403, a feature extracting unit 404, a collating unit 405, a biological information storing controller 406, a gate controller 407, and a re-collation determining unit 408.

In an identical manner to the image obtaining unit 10 of the first immigration authentication device 1, the image obtaining unit 402 is capable of taking images of the persons passing through the second departure gate 400.

In an identical manner to the biological information reader 11 of the first immigration authentication device 1, the biological information reader 403 reads the passport information, the biological information, and the identification information from the passport M carried by each person passing through the second departure gate 400.

In an identical manner to the feature extracting unit 12 of the first immigration authentication device 1, the feature extracting unit 404 extracts the face image from an image based on the image data output from the image obtaining unit 402.

The collating unit 405 performs a re-authentication operation for re-authenticating the person with the face image extracted by the feature extracting unit 404 (i.e., the person passing through the second departure gate 400). In the second embodiment, the collating unit 405 obtains the degree of similarity between the subspace specified in the feature information of the face image read by the biological information reader 403 and the subspace specified in the feature information of the face image extracted by the feature extracting unit 404. If the degree of similarity exceeds the first threshold value, the collating unit 405 determines that the person whose face image is read from the passport M is the same person whose face image is extracted by the feature extracting unit 404.

If the person whose face image is read from the passport M is determined to be the same person whose face image is extracted by the feature extracting unit 404 (i.e., if the re-authentication operation is successful); then the biological information storing controller 406 stores, in the biological information management device 2, re-authentication history information, which represents the history of the re-authentication operation performed by the collating unit 405, in a corresponding manner to the identification information read by the biological information reader 403.

In an identical manner to the gate controller 17 of the first immigration authentication device 1, the gate controller 407 controls the opening and closing of the second departure gate 400 based on the result of the re-authentication operation performed by the collating unit 405.

The re-collation determining unit 408 searches the authentication history information, which is stored in the biological information management device 2, for the authentication history information matching with a predetermined re-authentication history condition. Herein, the re-authentication history condition represents a condition regarding the history of the authentication operation having low reliability. For example, examples of the re-authentication history condition include a condition that the face image used in the authentication operation has noise equal to or greater than a predetermined value; a condition that the subspace obtained by the collation adjusting unit 14 and the subspace specified in the feature information extracted by the feature extracting unit 12 have the degree of similarity equal to or smaller than a second threshold value; and a plurality of authentication history information is stored in a corresponding manner to similar identification information. Herein, the second threshold value is higher than the first threshold value.

Only if the identification information that is stored in a corresponding manner to the authentication history information matching with the predetermined re-authentication history condition (an example of first identification information) is identical to the identification information read by the biological information reader 403 (an example of second identification information), the re-collation determining unit 408 controls the collating unit 405 to perform the re-authentication operation. As a result, in case a person having a similar face to the owner of the passport M or the twin sibling of the owner of the passport M is mistakenly allowed to pass through the first departure gate 3, the re-authentication operation is performed at the second departure gate 400 so that a person other than the owner of the passport M is reliably prevented from passing through the departure gate.

Figure 6:
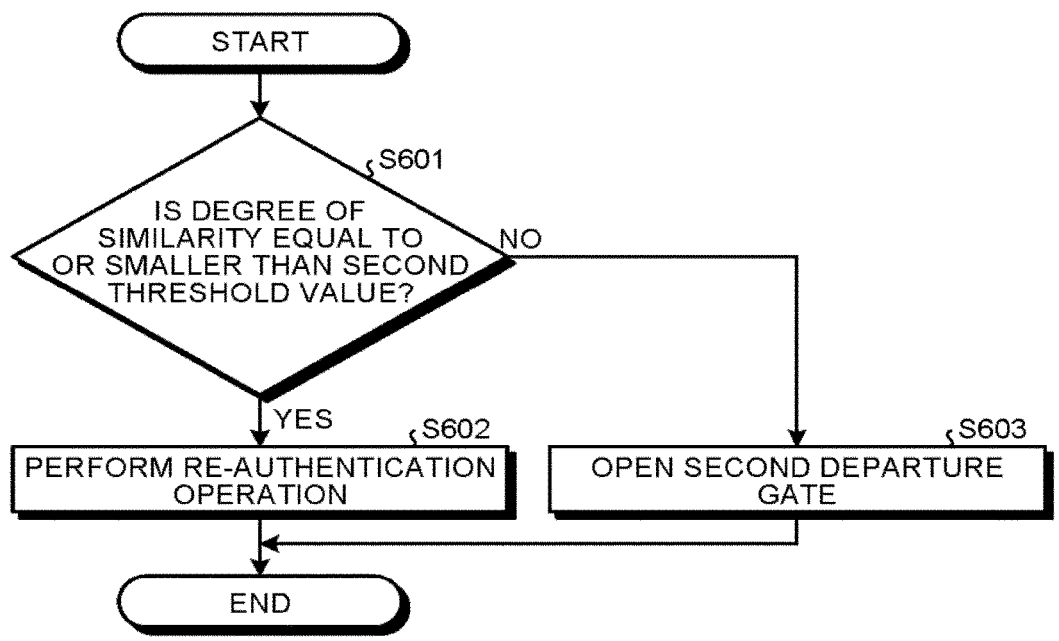
FIG. 6 is a flowchart for explaining a flow of operations during a re-authentication operation performed in the person authentication system according to the second embodiment.

Explained below with reference to FIG. 6 is a flow of operations during a re-authentication operation performed in the person authentication system according to the second embodiment. FIG. 6 is a flowchart for explaining a flow of operations during a re-authentication operation performed in the person authentication system according to the second embodiment.

The re-collation determining unit 408 searches the authentication history information, which is stored in the biological information management device 2, for the authentication history information including the degree of similarity equal to or smaller than the second threshold value (Step S601). If the authentication history information including the degree of similarity equal to or smaller than the second threshold value is present (Yes at Step S601), then the re-collation determining unit 408 notifies the collating unit 405 about the identification information stored in a corresponding manner to the authentication history information matching with the re-authentication history condition. When the biological information reader 403 reads the identification information identical to the notified identification information, the collating unit 405 performs the re-authentication operation (Step S602).

Meanwhile, if the authentication history information including the degree of similarity equal to or smaller than the second threshold value is not stored in the biological information management device 2 (No at Step S601), the re-collation determining unit 408 does not notify the identification information. In that case, once the biological information reader 403 reads the biological information, the gate controller 407 immediately opens the second departure gate 400 regardless of the authentication result of the re-authentication operation performed by the collating unit 405 (Step S603).

In this way, in the person authentication system according to the second embodiment, if the authentication operation at the first departure gate 3 has low reliability, then the authentication operation is again performed with respect to the same person. That enables achieving enhancement in the reliability of the authentication operation with respect to the person.

As described above, according to the first and second embodiments, the authentication operation is performed using a face image that does not have much difference with the face image to be authenticated. That enables achieving stability in the authentication accuracy with respect to aging or the difference in the gender.

Meanwhile, it is also possible to install a detecting unit (such as a motion sensor) for detecting fraudulent behavior (playing tricks with the person authentication system such as impersonating another person, following someone through, or shielding the camera lens) of any person passing through the first departure gate 3. Regarding the identification information obtained by the biological information reader 11 at the time of detection of fraudulent behavior by the detecting unit, the biological information storing controller 16 of the first immigration authentication device 1 can store that identification information in the biological information management device 2 (an example of a second memory). Thus, by checking the identification information stored in the biological information management device 2, it becomes possible to easily identify the person who has misbehaved.

Meanwhile, of the identification information read by the biological information reader 11, the first immigration authentication device 1 can store only the identification information matching with a predetermined abnormality factor information condition in the biological information management device 2. Herein, the predetermined abnormality factor information condition represents a condition regarding first information as the factor causing abnormality in the authentication operation. Examples of the abnormality factor information condition include the gender, the age, the birthdate, and the name of the person.

When a factor causing abnormality in the captured image is detected, the image quality determining unit 13 of the first immigration authentication device 1 can display, on a display (not illustrated) of the first immigration authentication device 1, a message (for example, remove the glasses or flip back the hair) instructing elimination of the factor detected to cause abnormality. As a result, the person regarding whom the factor causing abnormality in the captured image is detected can be prompted to eliminate the factor causing abnormality.

Meanwhile, if the first authentication operation of the person with the face image ends in failure; the collating unit 15 of the first immigration authentication device 1 can display, on the display (not illustrated), a message instructing manual authentication of the concerned person. With that, if the first authentication operation performed by the collating unit 15 ends in failure, the authentication operation for the person who is attempting to pass through the first departure gate 3 is prevented from being disrupted.

Meanwhile, the computer program executed in the first immigration authentication device 1 and the second immigration authentication device 401 according to the embodiments is stored in advance in a read only memory (ROM) and is provided as a computer program product. Alternatively, the computer program (the computer program product) executed in the first immigration authentication device 1 and the second immigration authentication device 401 according to the embodiments can be recorded as an installable file or an executable file in a computer-readable recording medium such as a compact disk read only memory (CD-ROM), a flexible disk (FD), a compact disk recordable (CD-R), or a digital versatile disk (DVD).

Still alternatively, the computer program (the computer program product) executed in the first immigration authentication device 1 and the second immigration authentication device 401 according to the embodiments can be saved in a downloadable manner on a computer connected to a network such as the Internet. Still alternatively, the computer program (the computer program product) executed in the first immigration authentication device 1 and the second immigration authentication device 401 according to the embodiments can be distributed over a network such as the Internet.

Herein, the computer program executed in the first immigration authentication device 1 and the second immigration authentication device 401 according to the embodiments contains modules for the constituent elements (the feature extracting unit 12, the image quality determining unit 13, the collation adjusting unit 14, the collating unit 15, the biological information storing controller 16, the gate controller 17, the feature extracting unit 404, the collating unit 405, the biological information storing controller 406, the gate controller 407, and the re-collation determining unit 408). As the actual hardware, a central processing unit (CPU) reads the computer program from the ROM mentioned above and runs it so that the computer program is loaded in a main memory device. As a result, the feature extracting unit 12, the image quality determining unit 13, the collation adjusting unit 14, the collating unit 15, the biological information storing controller 16, the gate controller 17, the feature extracting unit 404, the collating unit 405, the biological information storing controller 406, the gate controller 407, and the re-collation determining unit 408 are generated in the main memory device.

In the person authentication method according to the embodiments, of the identification information (first-type information) obtained from the passport M (an example of a medium), the identification information matching with a predetermined abnormality information condition (an abnormality factor information condition) is stored in a memory.

Moreover, in the person authentication method according to the embodiments, regarding the memory used to store the identification information of the person who is successfully authenticated in the first authentication operation, the memory represents a memory medium installed in the passport M. Furthermore, in the person authentication method according to the embodiments, regarding the memory used to store the identification information of the person who is successfully authenticated in the first authentication operation, the memory represents a memory unit installed in a server.

Moreover, in the person authentication method according to the embodiments, when the first authentication operation with respect to a person ends in failure, a message instructing manual authentication of that person is displayed on a display.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A person authentication method comprising:
    obtaining, from a medium carried by a person who passes through a first position, first information indicating gender and age of the person;
    performing a first authentication operation with respect to a person whose face image is included in a first image obtained by capturing a person passing through the first position;
    setting, as the first authentication operation, an authentication operation to be performed using a face image of a person having gender and age specified in the first information;
    storing history information of the first authentication operation in a corresponding manner to first identification information of a person who is successfully authenticated in the first authentication operation, obtaining, from a medium carried by a person who passes through a second position at downstream side of the first position in direction of traffic of persons, second identification information of the person, performing a re-authentication operation with respect to a person with face image included in a second image that is taken by capturing a person passing through the second position, retrieving, from the first memory, the history information matching with a predetermined reconfirmation history condition, and performing the re-authentication operation only when the second identification information matches with the first identification information that is stored in a corresponding manner to the retrieved history information.

2. The person authentication method according to claim 1, wherein detecting a factor causing abnormality in the first image, and setting, as the first authentication operation, an authentication operation to be performed using a face image having same factor causing abnormality as the detected factor causing abnormality.

3. The person authentication method according to claim 1, further comprising detecting fraudulent behavior of a person passing through the first position, and storing, in a second memory unit, the first information that is obtained when fraudulent behavior of a person passing through the first position is detected.

4. The person authentication method according to claim 2, further comprising displaying, on a display, a message instructing elimination of the detected factor causing abnormality.

* * * * *